United States Patent
Obersteiner et al.

(10) Patent No.: US 6,435,210 B1
(45) Date of Patent: Aug. 20, 2002

(54) ELECTROMAGNETIC VALVE

(75) Inventors: Georg Obersteiner, Königstein; Josef Lauer, Nonnweiler, both of (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/647,228

(22) PCT Filed: Mar. 26, 1999

(86) PCT No.: PCT/EP99/02070
§ 371 (c)(1),
(2), (4) Date: Jan. 26, 2001

(87) PCT Pub. No.: WO99/50116
PCT Pub. Date: Oct. 7, 1999

(30) Foreign Application Priority Data

Mar. 31, 1998 (DE) .......................................... 198 14 307
Aug. 12, 1998 (DE) .......................................... 198 36 493

(51) Int. Cl.$^7$ ............................. B60T 8/36; B60T 13/68
(52) U.S. Cl. ......................... 137/599.18; 137/601.14; 251/30.03; 303/119.3
(58) Field of Search .................. 251/30.03; 137/599.18, 137/601.14; 303/119.2, 119.3

(56) References Cited

U.S. PATENT DOCUMENTS

| | | | | | |
|---|---|---|---|---|---|
| 2,084,030 | A | * | 6/1937 | Hoppe | 251/30.03 X |
| 3,738,607 | A | * | 6/1973 | Peruglia | 251/30.03 |
| 4,623,118 | A | * | 11/1986 | Kumar | 251/30.03 X |
| 5,551,664 | A | * | 9/1996 | Boke | 251/30.03 |
| 5,673,980 | A | * | 10/1997 | Schwarz et al. | 137/601.14 X |
| 5,735,582 | A | * | 4/1998 | Eith et al. | 303/119.2 |
| 5,810,330 | A | * | 9/1998 | Eith et al. | 303/119.2 X |
| 5,865,213 | A | * | 2/1999 | Scheffel et al. | 251/129.15 X |
| 5,967,627 | A | * | 10/1999 | Hosoya et al. | 303/119.2 |
| 6,199,961 | B1 | * | 3/2001 | Beck | 303/119.2 X |

FOREIGN PATENT DOCUMENTS

| | | |
|---|---|---|
| DE | 42 36 482 | 10/1992 |
| DE | 41 12 920 | 5/1994 |
| DE | 195 29 724 | 2/1997 |
| DE | 197 00 405 | 7/1998 |
| WO | 97 28391 | 8/1997 |
| WO | 99 08915 | 2/1999 |

* cited by examiner

*Primary Examiner*—Lesley D. Morris
*Assistant Examiner*—John Bastianelli
(74) *Attorney, Agent, or Firm*—Rader, Fishman & Grauer PLLC

(57) ABSTRACT

The present invention relates to an electromagnetic valve which includes a valve tappet that is axially movably arranged in a valve housing and fastened to a magnetic armature, and a valve piston axially movable in the valve housing, a diaphragm-type pressure fluid passage in the valve piston that is closed or opened by the valve tappet, another unthrottled pressure fluid passage arranged between the valve piston and the valve housing that is closed or opened by the valve piston, pressure fluid channels which open into the valve housing on either side of the valve piston, with both pressure fluid passages closed in the initial position of the electromagnetic valve. The valve piston will open the other, unthrottled pressure fluid passage only if, on the one hand, the hydraulic pressure acting on the valve piston in the valve closing direction is lower than the pressure of a spring fitted to the valve piston and active in the valve opening direction, and if, on the other hand, the pressure fluid passage in the valve piston is opened by the electromagnetic energization of the valve by means of the valve tappet.

10 Claims, 2 Drawing Sheets

ELECTROMAGNETIC VALVE

TECHNICAL FIELD

The present invention generally relates to electromagnetic valves and more particularly relates to electromagnetic valves used in hydraulic brake systems.

BACKGROUND OF THE INVENTION

DE 195 29 724 A1 discloses an electromagnetic valve of this general type which is used in particular for hydraulic automotive vehicle brake systems with wheel slip control. The valve includes a valve housing into which a sleeve that closes the housing is inserted and guides a magnetic armature provided with a valve tappet. In its electromagnetically non-energized initial position, the electromagnetic valve is in its closed position because a pressure fluid passage inside a valve piston and also between the valve piston and the valve housing is closed by the valve tappet under the effect of a spring.

Shortcomings may be caused by the construction disclosed with respect to the assembly of the individual components in the valve housing, especially on the valve piston, and also regarding the suitability of the electromagnetic valve in terms of a simple bleeding and filling ability of the connected brake system.

An object of the present invention is to improve upon an electromagnetic valve of the type referred to hereinabove also in terms of fluid flow by using means which are as simple, inexpensive and operationally reliable as possible in order to eliminate the above-mentioned drawbacks.

DETAILED DESCRIPTION OF THE PREFERRED EMBODIMENTS

Figure 1:
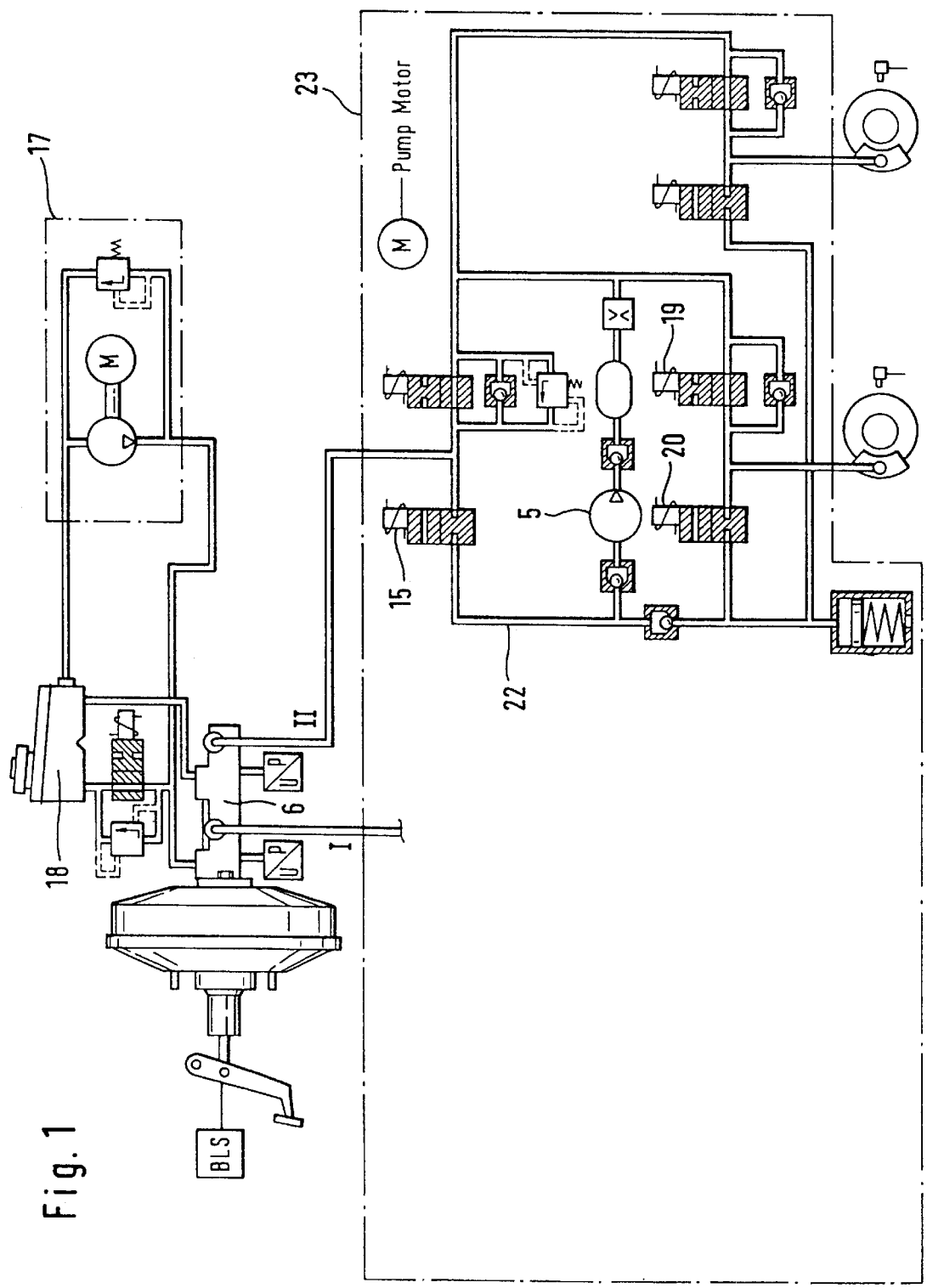
FIG. 1 is the basic circuit configuration of the electromagnetic valve in connection with the functionally essential features of a brake system with driving dynamics control.

FIG. 1 shows the hydraulic circuit diagram for a hydraulic brake system with wheel slip control and for driving dynamics control or driving stability control of an automotive vehicle.

The electromagnetic valve 15 of the present invention is configured as a two-way/two-position directional control valve and arranged in a line branch 22 of the two brake circuits. The line branch 22 forms a suction conduit from the brake pressure generator 6 to the high pressure pump 5 which delivers pressure fluid into the brake lines that lead to the wheel brakes in a wheel slip or driving dynamics control operation. Arranged in the respective portion between the high pressure pump 5 and each wheel brake is an inlet valve 19, that is switched open in the initial position, and an outlet valve 20 that is connected downstream thereof and closed in the initial position. By means of these inlet and outlet valves 19, 20, there is effected both wheel slip control in an anti-lock or traction slip control operation and driving dynamics control by way of an asymmetric brake pressure distribution in the curve-inward and curve-outward wheel brakes in order to compensate for an undesirable yawing torque of the vehicle. For purposes of an automatic brake operation as required for driving dynamics control, the illustrated brake system includes a precharging device 17 which, in the present embodiment, is a precharging pump interposed between the supply reservoir 18 and the brake pressure generator 6. This is one of several possible embodiments to realize precharging so that, among others, an independently operated brake force booster which precedes the brake pressure generator 6 may be used, with the construction being dimensioned accordingly.

The mode of operation of the electromagnetic valve 15 of the present invention will be described in detail in the following by making reference to the brake system in FIG. 1, to be briefly explained hereinbelow, and the following illustration of the electromagnetic valve 15 according to FIG. 2.

Figure 2:
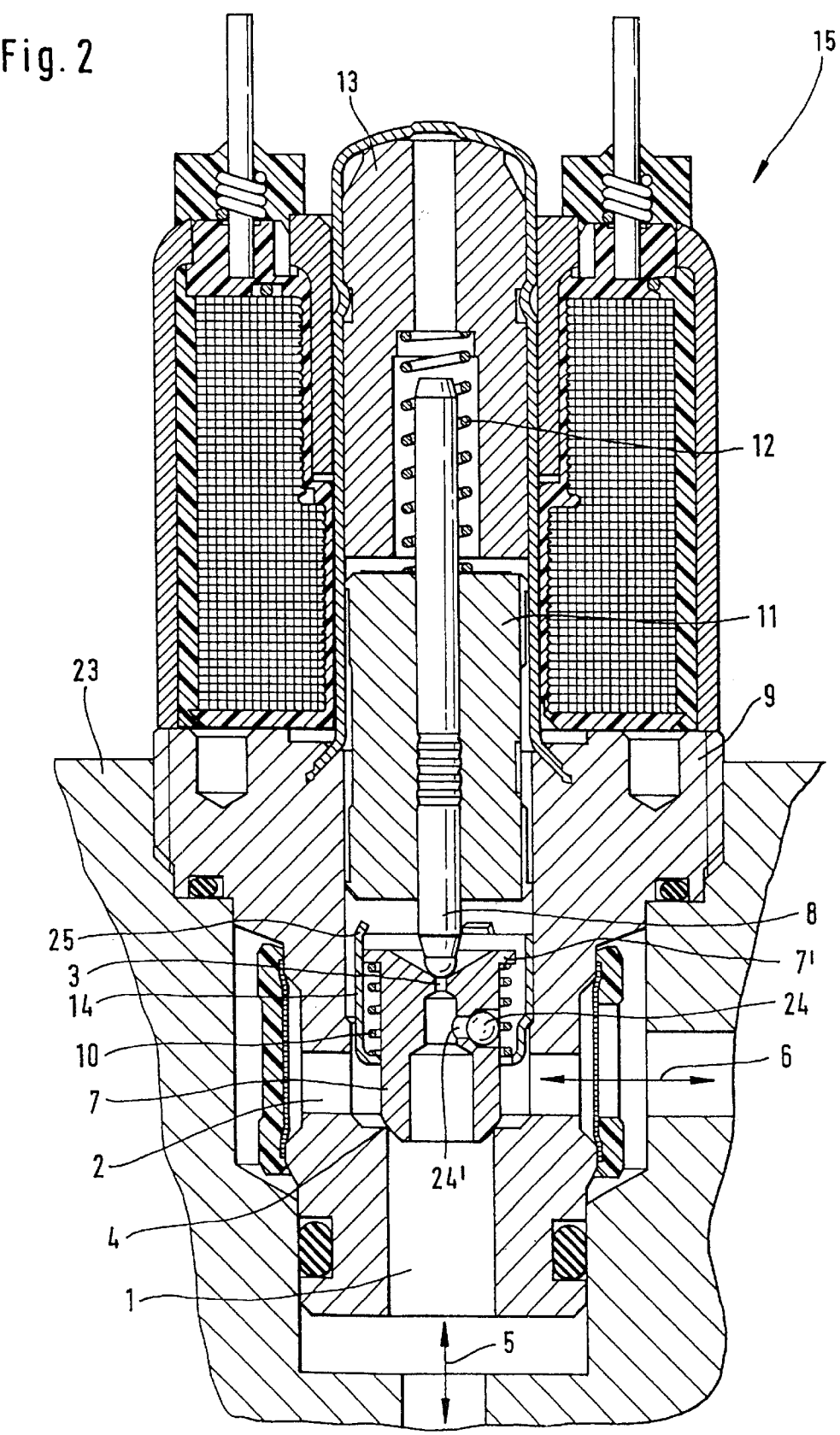
FIG. 2 is a constructive embodiment of the electromagnetic valve of the present invention.

FIG. 2 is a cross-sectional view of an embodiment of the electromagnetic valve 15 of the present invention.

The electromagnetic valve 15 has a valve housing 9 configured as a cartridge and screwed or press-fitted into a block-shaped accommodating member 23, in which housing a valve tappet 8 is guided that is axially movably secured to a magnetic armature 11. Arranged below the valve tappet 8 is a valve piston 7 which is movable in the valve housing 9 equally in an axial direction and through which extends a pressure fluid passage 3 that is disposed coaxially to the valve tappet 8 and has a diaphragm-type cross-section. The pressure fluid passage 3 is closed by the valve tappet 8 in the electromagnetically non-energized position of the valve under the effect of a pressure spring 12. Also, another annular pressure fluid passage 4 which is arranged between the valve piston 7 and a step of the valve housing 9 and has a comparatively large cross-section is closed by the valve piston 7 in the initial position of the electromagnetic valve 15 under the effect of the pressure spring 12 on the valve tappet 8. On either side of the valve piston 7, pressure fluid channels 1, 2 open into the valve housing 9 which are normally isolated from each other in the initial position of the electromagnetic valve 15, as shown in the drawing, with the exception that a hydraulic connection is possible from the high pressure pump 5 in the direction of the brake pressure generator 6 only by way of a non-return valve 24 that is inserted into a bypass channel 24' of the valve piston 7.

With reference to the initially explained description of FIG. 1, it becomes apparent that pressure fluid will by no means propagate from the brake pressure generator 6 to the high pressure pump 5 in the initial position of the electromagnetic valve 15.

The electromagnetic valve 15 remains in an operating position closing the pressure fluid passages 3, 4 both in a wheel-slip-free brake operation and in the brake release operation. However, the said valve adopts the open operating position in the event of an automatic brake intervention necessary for driving stability control of the automotive vehicle or for traction slip control purposes. Corresponding to the illustration of FIG. 1, there will be a connection between the pressure fluid channel 1 via the valve piston 7 to a precharged brake pressure generator 6 because the diaphragm-type pressure fluid passage 3 in the valve piston 7 is opened by the valve tappet 8. Thus, in view of the use of a precharged brake pressure generator 6, a sufficient pressure fluid supply of the high pressure pump 5 is ensured in spite of the relatively small opening cross-section in the area of the diaphragm-type pressure fluid passage 3.

In an anti-lock control operation of the brake system of FIG. 1, the non-energized electromagnetic valve 15 totally isolates the pump suction side from the brake pressure generator 6 because the valve tappet 8 bears against the valve piston 7 and the valve piston 7 bears against the housing step that forms the valve seat due to the pressure spring 12 abutting the magnetic armature 11. The two pressure fluid passages 3, 4 are closed thereby. The pressure that is adjusted by the pedal force in the brake pressure generator 6 to this end likewise acts on the end surface of the valve piston 7 facing the valve tappet 8 so that the valve tappet 8, jointly with the valve piston 7, in a hydraulically assisted way keeps the pressure fluid passages 3, 4 closed. The non-return valve 24 arranged in the bypass channel 24' is also urged onto its valve seat by the hydraulic pressure of the brake pressure generator According to the design of FIG. 2, it is ensured that the valve piston 7 will open the other unthrottled pressure fluid passage 4 only if, on the one hand, the hydraulic pressure acting on the valve piston 7 in the valve closing direction is lower than the pressure of a spring 10 which actuates the valve piston 7 in the valve opening direction and if, on the other hand, the pressure fluid passage 3 in the valve piston is opened by the electromagnetic energization of the valve by means of the valve tappet 8. The valve piston 7 may then move axially in relation to the valve tappet 8 for release of the pressure fluid channel 4. Consequently, only the diaphragm-type pressure fluid passage 3 at the valve piston 7 is opened in the presence of a high hydraulic pressure difference between the pressure fluid channels 1, 2, and in the presence of a small pressure difference the valve piston 7 additionally opens the relatively large, unthrottled pressure fluid passage 4 assisted by spring force. Advantageously, this large pressure fluid passage 4 is not hindered in terms of fluid flow by the captivated arrangement of the spring 10 on the valve piston 7. In addition, the proposed captivated arrangement of the spring 10 permits a simplified assembly of the valve piston 7 in connection with the non-return valve 24 and the sleeve 14 in the valve housing 9 according to the drawings. Along with the valve piston 7, the spring 10 is axially movably guided in the sleeve 14, concentrically relative to the valve tappet 8, and compressed between an offset fringe area at the bottom of sleeve 14 and a bead 7' at the valve piston 7. The valve piston 7 extends through the offset fringe area of the sleeve 14 in the direction of the further pressure fluid passage 4 and, in conjunction with the above-mentioned components, forms a subassembly that can be handled independently. Besides, the valve piston 7 has a bypass channel 24' which opens at right angles into the stepped pressure fluid passage 3 and equally has a bore step for the accommodation of the spherical non-return valve 24. The non-return valve 24 closes the bypass channel 24' in the direction of the pressure fluid channel 1 that leads to the high pressure pump 5 so that the high pressure pump 5 has merely inside the electromagnetic valve 15 a hydraulically operable bypass connection in the direction of the pressure fluid passage 2 that leads to the brake pressure generator 6. The non-return valve 24 integrated in the valve piston 7 ensures optimal bleeding and filling of the pressure fluid channel 1 in its closed initial position. Besides, the non-return valve 24 permits a pressure balance between the two pressure fluid channels 1, 2 when temperature-responsive pressure variations are to be expected in the brake release position. The development of vacuum pressure in the pressure fluid channel 1 is in any case prevented when the pressure fluid passages 3, 4 are closed. A construction which is especially favorable to manufacture and handle is achieved because the valve piston 7 with its bead 7' disposed at the level of the valve closure member is axially movably compressed between the spring 10 and an offset portion 25 arranged at the edge of sleeve 14. The spring 10 which is slipped upon the valve piston 7 extends over the bypass channel 24', dropping out of the non-return valve 24 being thereby prevented in a simple fashion. The sleeve 14 is guided at least partially along a wall of the bore in the valve housing 9 and is simultaneously positioned in abutment on a small housing step. The bottom of the sleeve 14 which forms the abutment for spring 10 ends already remote from the pressure fluid passage 4 so that the sleeve 14 is no obstacle to fluid flow between the two pressure fluid channels 1, 2 when the valve piston 7 opens the pressure fluid passage 4.

The valve housing 9 is preferably made as a turned part in which the magnetic armature 11 with the valve tappet 8 is guided in sections. The above-mentioned pressure spring 12 which acts upon the end of the magnetic armature 11 remote from the valve piston 7 is arranged between the magnetic armature 11 and the dome-shaped sleeve portion on the valve housing 9 which accommodates a magnetic core 13. The valve piston 7 is likewise configured as a sleeve-shaped turned part and centered in the valve housing 9 by way of sleeve 14.

All parts described hereinabove, thus, have a rotationally symmetric alignment relative to the valve axis. The pressure fluid channel 2 that is arranged above the valve piston 7 extends at right angles through the stepped bore 14 so that an annular channel for connecting to the brake pressure generator 6 is provided between the block-shaped accommodating member 23 and the valve housing 9.

What is claimed is:

1. Electromagnetic valve, comprising:
   a valve tappet that is axially movably arranged in a valve housing and fastened to a magnetic armature,
   a valve piston axially movable in the valve housing, wherein a diaphragm-type pressure fluid passage resides in the valve piston, wherein said passage is closed and opened by the valve tappet,
   an unthrottled pressure fluid passage arranged between the valve piston and the valve housing that is closed or opened by the valve piston, wherein said valve housing includes pressure fluid channels which open into the valve housing on either side of the valve piston, with both pressure fluid passages closed in the initial position of the electromagnetic valve, wherein the valve piston will open the unthrottled pressure fluid passage if the hydraulic pressure acting on the valve piston in the valve closing direction is lower than the pressure of a spring fitted to the valve piston or if the pressure fluid passage in the valve piston is opened by the electromagnetic energization of the valve by means of the valve tappet further including a non-return valve residing in the valve piston in a bypass arrangement to the two pressure fluid passages.

2. Electromagnetic valve as claimed in claim 1, wherein the spring is captivated at the valve piston.

3. Electromagnetic valve as claimed in claim 1, wherein the spring jointly with the valve piston, is guided axially movably in a sleeve and concentrically relative to the valve tappet.

4. Electromagnetic valve as claimed in claim 3, wherein the spring is compressed between a disc-shaped bottom area of the sleeve and a bead at the valve piston.

5. Electromagnetic valve as claimed in claim 4, wherein the valve piston projects through the bottom area of the sleeve in the direction of the other pressure fluid passage.

6. Electromagnetic valve as claimed in claim 1, wherein the non-return valve closes a bypass channel in the valve piston in the direction of the pressure fluid channel that leads to a high pressure pump.

7. Electromagnetic valve as claimed in claim 1, wherein the non-return valve in the valve piston opens a bypass channel in the direction of the pressure fluid passage that leads to a brake pressure generator.

8. Electromagnetic valve as claimed in claim 4, wherein the valve piston with its bead is axially movably compressed between the spring and an offset portion at the open edge of the sleeve into which the valve tappet extends.

9. Electromagnetic valve as claimed in claim 8, wherein the sleeve is aligned coaxially to the magnetic armature and guided at least partly along a wall in the valve housing.

10. Electromagnetic valve, comprising:

a valve tappet that is axially movably arranged in a valve housing and fastened to a magnetic armature, a valve piston axially movable in the valve housing, wherein a diaphragm-type pressure fluid passage resides in the valve piston, wherein said passage is closed and opened by the valve tappet, an unthrottled pressure fluid passage arranged between the valve piston and the valve housing that is closed or opened by the valve piston, wherein said valve housing includes pressure fluid channels which open into the valve housing on either side of the valve piston, with both pressure fluid passages closed in the initial position of the electromagnetic valve, wherein the valve piston will open the unthrottled pressure fluid passage if the hydraulic pressure acting on the valve piston in the valve closing direction is lower than the pressure of a spring fitted to the valve piston or if the pressure fluid passage in the valve piston is opened by the electromagnetic energization of the valve by means of the valve tappet, wherein the spring jointly with the valve piston, is guided axially movably in a sleeve and concentrically relative to the valve tappet, wherein the spring is compressed between a disc-shaped bottom area of the sleeve and a bead at the valve piston, wherein the valve piston projects through the bottom area of the sleeve in the direction of the other pressure fluid passage.

\* \* \* \* \*